United States Patent
Lindblom

[11] Patent Number: 5,807,041
[45] Date of Patent: Sep. 15, 1998

[54] DRILL HAVING A POINTED CENTER CUTTING EDGE FORMED ON A FLUTED SHANK

[75] Inventor: Stefan Lindblom, Gävle, Sweden

[73] Assignee: Sandvik AB, Sandviken, Sweden

[21] Appl. No.: 848,741

[22] Filed: May 1, 1997

[51] Int. Cl.⁶ .................................................. B23B 51/02
[52] U.S. Cl. .......................................... 408/230; 408/227
[58] Field of Search ................................... 408/227, 230, 408/199

[56] References Cited

U.S. PATENT DOCUMENTS

| | | |
|---|---|---|
| 4,222,690 | 9/1980 | Hosoi . |
| 4,565,473 | 1/1986 | Hosoi . |
| 4,687,387 | 8/1987 | Roos ........................................ 408/230 |
| 4,961,672 | 10/1990 | Lindberg ................................. 408/230 |
| 5,312,209 | 5/1994 | Lindblom . |
| 5,423,640 | 6/1995 | Lindblom et al. ....................... 408/230 |
| 5,429,458 | 7/1995 | Tukala et al. . |
| 5,478,176 | 12/1995 | Stedt et al. . |

FOREIGN PATENT DOCUMENTS

| | | | |
|---|---|---|---|
| 0 132 149 | 1/1985 | European Pat. Off. . | |
| 90212 | 7/1980 | Japan ..................................... | 408/230 |
| 92019 | 4/1989 | Japan ..................................... | 408/230 |

*Primary Examiner*—Daniel W. Howell
*Attorney, Agent, or Firm*—Burns, Doane, Swecker & Mathis, L.L.P.

[57] ABSTRACT

A drill includes a shank having a tip with two cutting inserts located in a main plane. The cutting inserts have short central cutting edges oriented in a secondary plane. The edges form a pointed center cutting edge for the purpose of entering a workpiece and thereby centering the drill. In the shank two helical flutes are provided, the flutes extending from the tip to the base end. The flutes are located diametrically opposite each other and are separated by two helical lands. The flutes lie in a flute plane that extends at an angle of 90° to the land plane. The secondary plane forms an angle of about 90° to the orientation of the land plane when viewed at the base end of the shank.

5 Claims, 2 Drawing Sheets

DRILL HAVING A POINTED CENTER CUTTING EDGE FORMED ON A FLUTED SHANK

TECHNICAL FIELD OF THE INVENTION

The present invention relates to a drill of the type including a shank having a front, tip-forming end with two inserts located in a common main plane, or cutting insert-like portions having main cutting edges parallel to the main plane. The cutting edges at opposite ends transform into shorter, central cutting edges oriented in a substantially common secondary plane extending at an acute angle relative to said main plane. The cutting edges together form a pointed center cutting edge for the purpose of entering a workpiece, whereby the drill is centered in a desired engagement point relative to said workpiece. The shank has two at least partly helical flutes extending from the tip end to a base end in connection with a rear thicker portion of the shank. The flutes, when viewed in any arbitrary cross-section along the shank are located diametrically opposite each other in a plane extending at an angle of 90° to a plane that is common to two lands disposed on both sides of the flutes. The shank has maximum anti-bending rigidity in said plane.

PRIOR ART

Drills of the type generally defined above are previously known from Lindblom U.S. Pat. No. 5,312,209 and Stedt et al. U.S. Pat. No. 5,478,176. In practical use of such drills it has been observed that different drills exhibit significantly different behavior upon entering a workpiece. Certain drills, when brought into engagement with the workpiece, become centered relatively distinctly in the wanted engagement point and produce a hole having a relatively accurate entering diameter. In other cases the center cutting edge of the drill, when entering the workpiece, is subjected to wobbling of different kinds; the consequence of this may be that the absolute center of the drill is drawn away from the exactly wanted engagement point causing the drill to initially cut a hole having too large of an entry diameter that is not acceptable. Thus, it occurs that the entry diameter will be up to 0.5–1 mm larger than the nominal dimension. In practice this can lead sometimes to the rejection of very expensive workpieces.

OBJECTS AND FEATURES OF THE INVENTION

The present invention aims at solving the problems mentioned above and produce an improved drill. A primary aim of the invention is thus to produce a drill with a center cutting edge having minimal tendency to wobble or kick back when entering the workpiece. According to the invention this aim is realized by a drill comprising a rear holding portion defining an axis of rotation, and a shank extending axially forwardly therefrom. The shank terminates in a tip-forming end in which two cutting edges are disposed. The cutting edges include respective first portions disposed parallel to a main plane which contains the axis and extends midway between the cutting edges. The cutting edges include respective second portions extending toward one another and toward the axis to form together a pointed central cutting edge oriented in a secondary plane which contains the axis and which is oriented at an acute angle to the main plane. The shank includes two flutes extending therealong from the tip end to a base end of the shank where the shank joins the holding portion. The flutes are situated diametrically opposite one another and are separated circumferentially by two lands. The flutes lie in a flute plane containing the axis. The lands lie in a land plane containing the axis. The flute plane extends perpendicularly to the land plane. The land plane, at the base end of the shank, forms an angle of 80° to 100° with the second plane.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF THE PREFERRED EMBODIMENT

Figure 1:
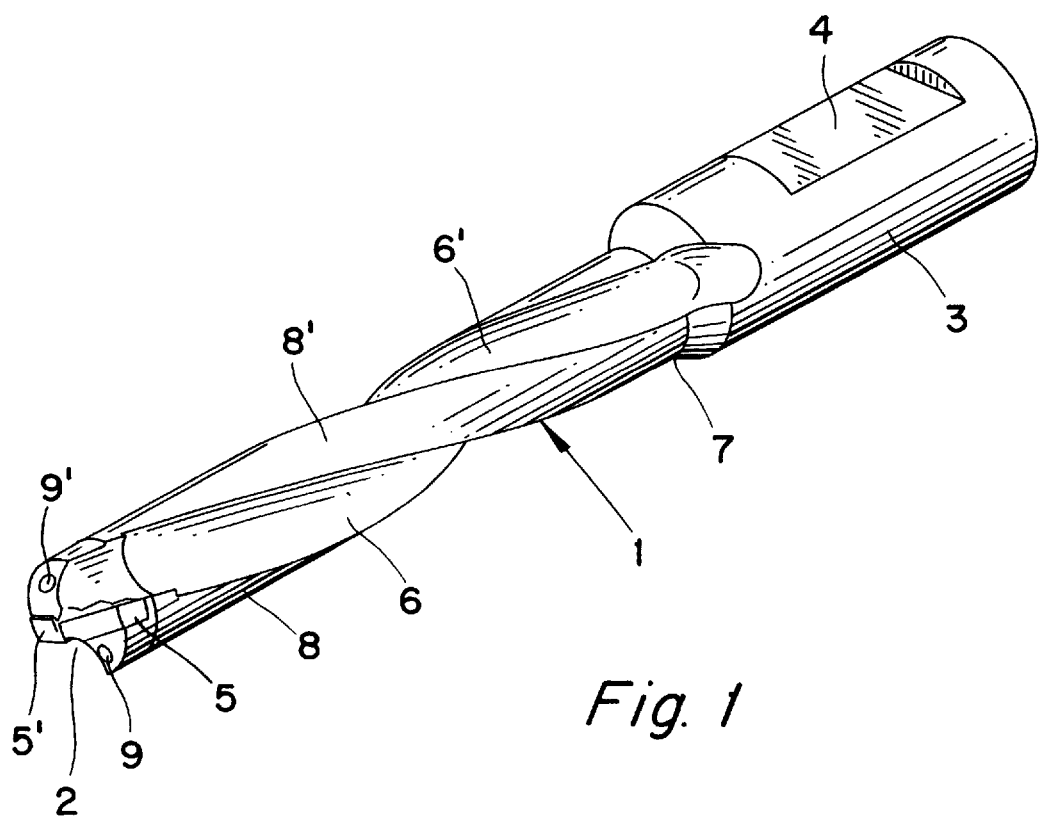
FIG. 1 is a perspective view that generally illustrates the type of drill to which the invention pertains.

The drill disclosed in FIG. 1 includes a shank 1 having a front, tip-forming end 2 and a thicker, rear end portion 3 that has a special design, e.g. with a planar surface 4 in order to be secured torsionally rigid in a holder. At the front end there are two coplanar cutting inserts or cutting insert-like portions 5, 5' (in present drills the inserts are designed as parts of a common cemented carbide body). Said cutting inserts are located at outer, free ends of two flutes 6, 6' that are at least partly helical or twisted and extend from the tip end to a base end 7 at the thicker portion 3. The flutes 6, 6' are delimited from each other by two likewise helical lands 8, 8'. In FIG. 1 it is depicted how two flushing ducts 9, 9' emerge in the tip end of the shank.

Figure 3:
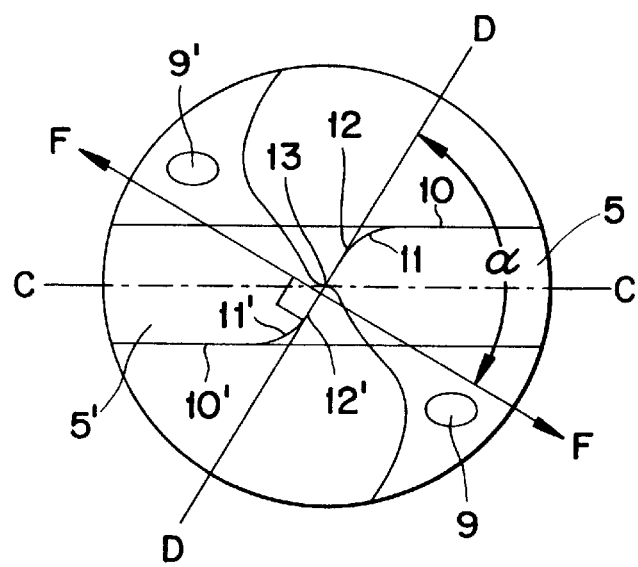
FIG. 3 is an enlarged, end view taken in direction A—A in FIG. 2.

The coplanar inserts 5, 5' are disposed in a main plane C—C (FIG. 3). Each cutting insert has a comparatively long, straight main cutting edge 10, 10' that is substantially parallel to the plane C—C. By way of a rounded transition portion 11 or 11' respectively each main cutting edge is transformed into a central, shorter cutting edge 12 or 12'. The central cutting edges 12, 12' are oriented substantially in a common, secondary plane D—D that extends at an acute angle (e.g., about 60°) relative to the main plane C—C. The cutting edges 12, 12' form together a center cutting edge that is pointed, i.e., at its midpoint it has a punch-like, diminutive material portion or punch portion 13 that forms the absolute center of the drill tip and its outermost point.

Figure 4:
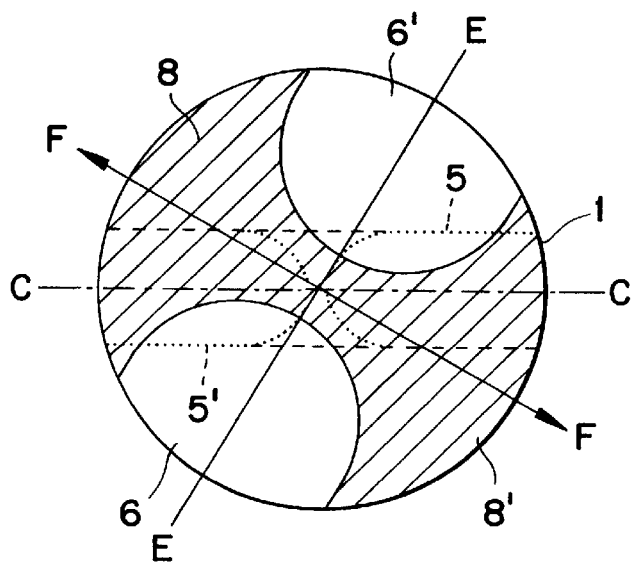
FIG. 4 is an enlarged, cross-section taken along line B—B in FIG. 2.

From FIG. 4 it can be seen that the two flutes 6, 6' when viewed in any arbitrary cross-section taken along the shank are located diametrically opposite to each other. More specifically the flutes are oriented in a common flute or duct plane E—E. Also, the two lands 8, 8' are located diametrically opposite each other in a land plane F—F. As is clearly shown in FIG. 4 the duct plane E—E extends perpendicularly to the land plane F—F. It is axiomatic that the drill shank has maximum anti-bending rigidity in the land plane F—F and minimal anti-bending rigidity in the duct plane E—E.

As described thus far, the drill is essentially known from Lindblom U.S. Pat. No. 5,312,209.

Figure 2:
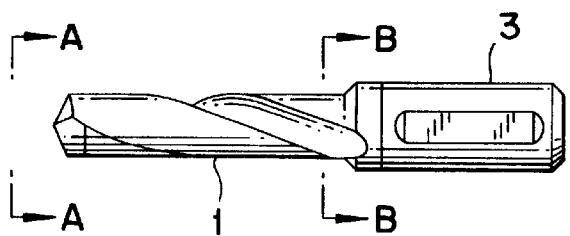
FIG. 2 is a side view of a drill according to the invention.

The present invention is based on a realization that the physical orientation of the center cutting edge 12, 12' (i.e., the plane D—D) in relation to the orientation of the land plane (i.e., the main rigidity direction F—F) at the base end of the shank, i.e., when viewed in the section B—B, is of significant importance for the workpiece-entering properties of the drill tip. The disturbing forces that may occur at the moment of entry, even if the drill initially is centered correctly, are normally due to chip compressions or chip cloggings occurring close to the center of the drill. These chip compressions or chip cloggings will, in turn, affect the center cutting edge 12, 12' to a varying degree and more specifically substantially at an angle of 90° to the plane D—D. According to the present invention the drill disclosed in FIGS. 2–4 has been designed in such a way that the secondary plane D—D of the center cutting edge 12, 12' forms an angle α of from 80° to 100° with the land plane F—F at the base end 7 of the shank (i.e., in section B—B). More preferably, angle α is from 85° to 95° and most preferably is 90°. In FIG. 4 the two cutting inserts 5, 5' are indicated by dotted lines and from this figure it can be seen that the plane D—D substantially coincides with the duct plane E—E at the base end, i.e., in the cross-section B—B. This means that the land plane F—F in which the shank has its highest anti-bending rigidity is, in the area of the base end, oriented perpendicularly to the center cutting edge 12, 12'. Therefore, when the two cutting edges 12, 12' are subjected to forces in connection with the entry of the drill tip into a workpiece, said cutting edges 12, 12' achieve maximum shape rigidity. That is, the tendency for the cutting edges to wobble, due to bending movements in the shank, is reduced to a minimum.

In a twist drill of the type depicted in the drawings, the desired orientation of the center cutting edge relative to the land plane F—F of the base end portion may be achieved in different ways during the manufacturing of the drill. One way is to guide progressively the pitch angle of the flutes during the milling operation (by a radiused shank end mill) of the flutes. That is, the pitch angle of the flutes is increased or decreased continuously from the tip towards the base end whereby the main rigidity direction or the land plane F in the cross-section B—B lies at an angle of about 90° to the secondary plane D—D of the center cutting edge 12, 12'. Another way is to change the pitch angle of the flutes in two or more steps.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A drill comprising a rear holding portion defining an axis of rotation, and a shank extending axially forwardly therefrom; the shank terminating in a tip-forming end in which two cutting edges are disposed; the cutting edges including respective first and second portions, the first portion disposed parallel to a main plane, the main plane extending midway between the cutting edges and containing the axis; the second portions extending toward one another and toward the axis to form together a pointed central cutting edge oriented in a secondary plane, the secondary plane containing the axis and oriented at an acute angle to the main plane; the shank including two flutes extending therealong from the tip end to a base end of the shank where the shank joins the holding portion; the flutes situated diametrically opposite one another and separated circumferentially by two lands; the flutes lying in a flute plane containing the axis; the lands lying in a land plane containing the axis; the flute plane extending perpendicularly to the land plane; the land plane forming an angle of 80° to 100° with the secondary plane when viewed at the base end of the shank.

2. The drill according to claim 1 wherein the angle formed between the secondary and land planes is 85° to 95°.

3. The drill according to claim 1 wherein the angle formed between the secondary and land planes is 90°.

4. The drill according to claim 1 wherein the flutes extend helically along the shaft.

5. The drill according to claim 1, further including two inserts mounted in the tip end and lying in the main plane; the inserts forming respective ones of the cutting edges.

\* \* \* \* \*